(12) United States Patent
Hoffmann et al.

(10) Patent No.: US 7,632,372 B2
(45) Date of Patent: Dec. 15, 2009

(54) REPLACEABLE CREEL IN A FIBER PLACEMENT MACHINE

(75) Inventors: Klaus Hoffmann, Rockford, IL (US); Mark Curtis Tingley, Hutsonville, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 519 days.

(21) Appl. No.: 11/510,164

(22) Filed: Aug. 25, 2006

(65) Prior Publication Data

US 2007/0044897 A1 Mar. 1, 2007

Related U.S. Application Data

(60) Provisional application No. 60/711,291, filed on Aug. 25, 2005.

(51) Int. Cl.
*B65H 81/00* (2006.01)
(52) U.S. Cl. .................. 156/169; 156/173; 156/175
(58) Field of Classification Search ............... 156/169, 156/172, 173, 175, 441, 433, 523, 574
See application file for complete search history.

(56) References Cited

U.S. PATENT DOCUMENTS

| | | | | |
|---|---|---|---|---|
| 3,055,786 A | * | 9/1962 | Hendrix | 156/158 |
| 3,525,207 A | * | 8/1970 | Irwin | 57/204 |
| 3,695,975 A | * | 10/1972 | Williams | 156/433 |
| 3,957,410 A | | 5/1976 | Goldsworthy et al. | |
| 4,428,992 A | * | 1/1984 | Street | 428/114 |
| 4,515,328 A | | 5/1985 | Payne, Jr. | |
| 5,266,139 A | * | 11/1993 | Yokota et al. | 156/169 |
| 6,968,883 B2 | * | 11/2005 | Torres Martinez | 156/433 |
| 7,093,638 B2 | * | 8/2006 | Bonaventura | 156/441 |
| 2006/0180264 A1 | * | 8/2006 | Kisch et al. | 156/173 |

FOREIGN PATENT DOCUMENTS

| | | |
|---|---|---|
| EP | 1 342 555 A1 | 9/2003 |
| GB | 2300866 A * | 11/1996 |
| WO | WO 2005/105641 A2 | 11/2005 |

* cited by examiner

*Primary Examiner*—Jeff H Aftergut
(74) *Attorney, Agent, or Firm*—Reinhart Boerner Van Deuren P.C.

(57) ABSTRACT

An apparatus and method are provided for replacing a creel in a fiber placement machine, by sequentially moving replaceable creels into place on the fiber placement machine, via tracks and/or guide rails, as one or more spools in a previously operating creel are exhausted, and removing the creel having the one or more exhausted spools, to thereby allow fiber placement to continue from the replacement creel while the creel having one or more exhausted spools of material is replenished. An auto-splice apparatus and method are incorporated into the replaceable creel and fiber placement machine, for assisting in the exchange of replaceable creels.

26 Claims, 12 Drawing Sheets

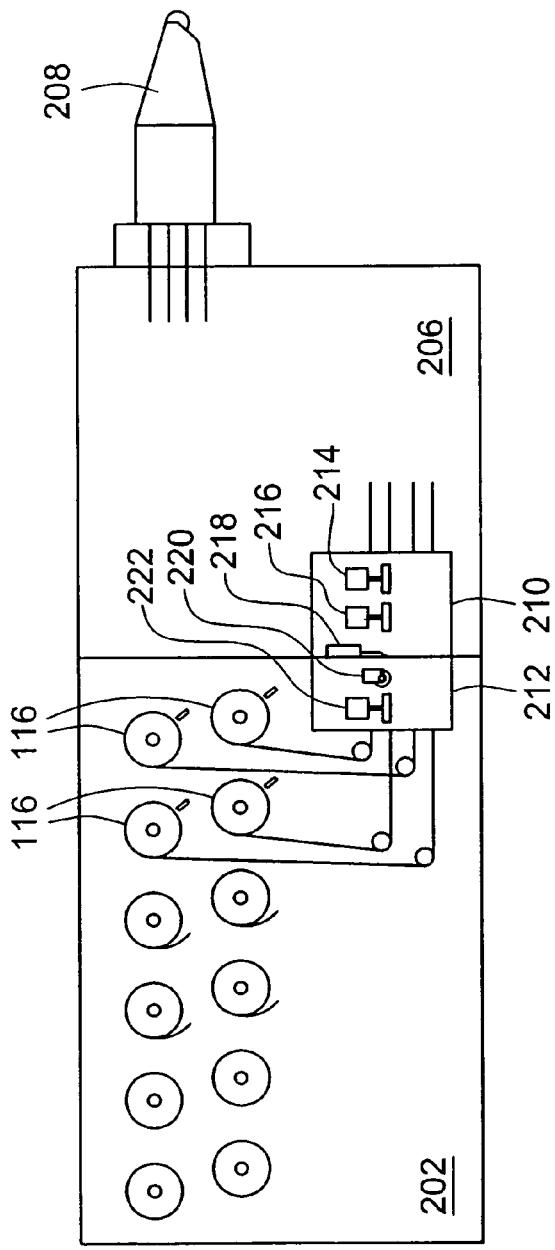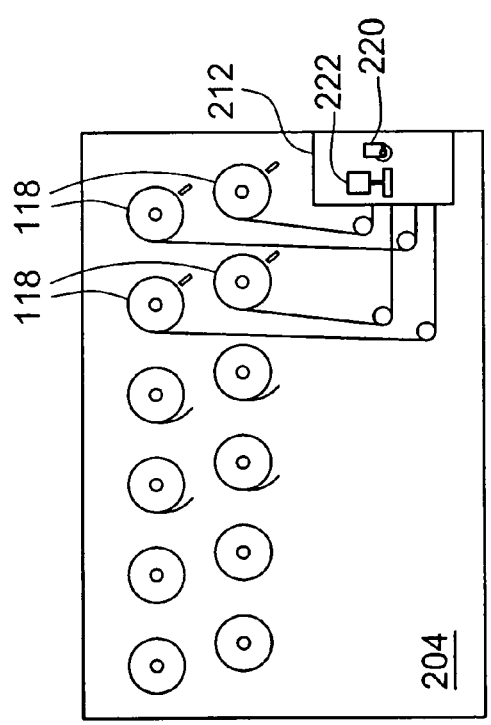
FIG. 11

FIG. 12
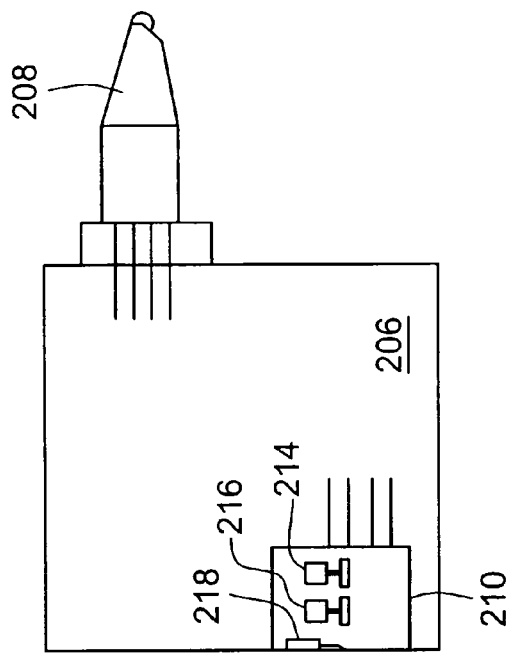
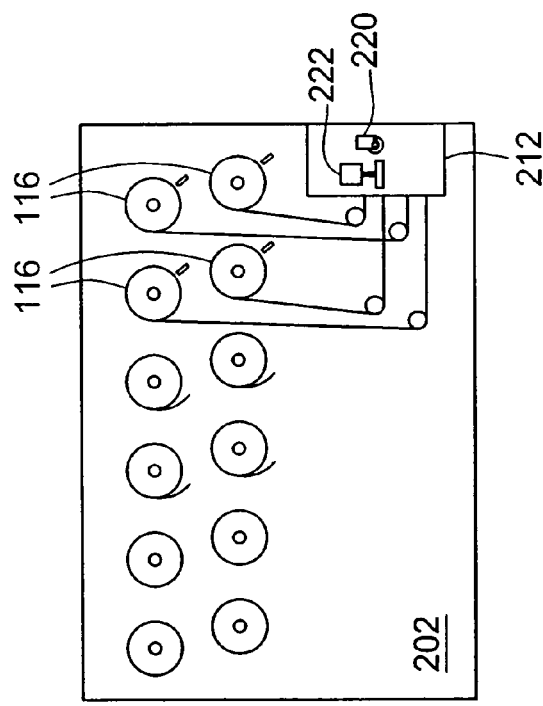
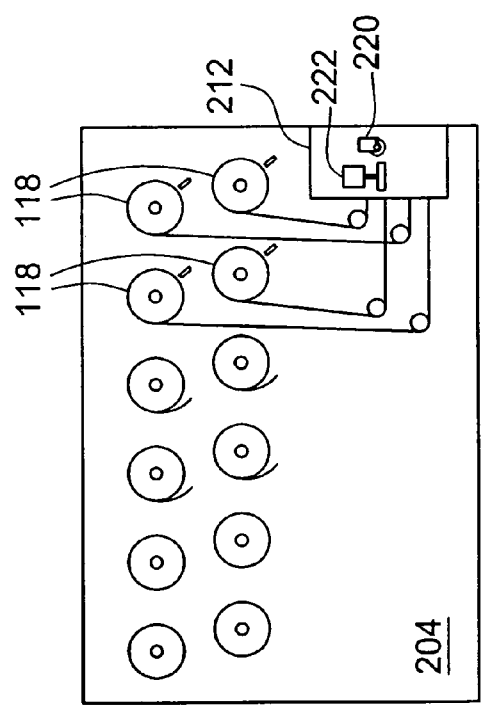

REPLACEABLE CREEL IN A FIBER PLACEMENT MACHINE

CROSS-REFERENCE TO RELATED PATENT APPLICATIONS

This patent claims the benefit of U.S. Provisional Patent Application No. 60/711,291 filed Aug. 25, 2005, the disclosure and teachings of which are incorporated herein, by reference, in their entireties.

FIELD OF THE INVENTION

This invention relates to the forming of composite structures with automated fiber placement machines, and more particularly to fiber placement machines utilizing creels for storage of spools of tows of material for use in forming the composite structure.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Individual tapes or tows are manipulated by the fiber placement machine to form a band of material that is deposited onto a tool. Parts are built up layer-by-layer, with tapes or tows of composite material, with the angle at which each layer "ply" is laid onto the tool being precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal loads paths, which potentially results in lighter structures and lower costs than in structures made by other production methods.

The individual tows of material are typically wound onto spools, stored in an environmentally-controlled structure known as a creel. A single creel may commonly include, for example, provisions for storage and simultaneous outfeed from 32 spools. During the fiber placement process, particularly on large parts, the tows stored on one or more of the spools may be completely used up, prior to completion of the part.

It is desirable, therefore, to provide a method and/or apparatus for replenishing the exhausted spool as quickly and efficiently as possible, so as to minimize interruption of the fiber placement process. In this regard, it would be highly desirable to provide a method and/or apparatus for replacing an entire creel, so that the fiber placement process may continue from a fresh creel, while the creel having one or more exhausted spools can be replenished off-line.

BRIEF SUMMARY OF THE INVENTION

An apparatus and method are provided for replacing a creel in a fiber placement machine, by sequentially moving replacement creels into place on tracks and/or guide rails, as one or more spools in a previously operating creel are exhausted, and removing the creel having the one or more exhausted spools, to thereby allow fiber placement to continue from the replacement creel while the creel having one or more exhausted spools of material is replenished. The invention also allows a convenient means of changing to a different material, or tows of different widths, etc., during the fiber placement process.

In some forms of the invention, an apparatus and/or method for replacing a creel in a fiber placement machine may also incorporate apparatuses and methods for accomplishing an auto-splice of the fiber tows as the creels are interchanged.

A method for operating a fiber placement machine during a fiber placement process, according to the invention, may include supporting a first replaceable creel in an alignment position, aligning the first replaceable creel with the fiber placement machine, and attaching the first replaceable creel to the fiber placement machine. The first creel may be supported in the alignment position at a creel exchange location, with the method further including, moving the fiber placement machine to the creel exchange location. The creel may be loaded and/or replenished while the creel is detached from the fiber placement machine.

Where the fiber placement machine has one or more first tows therein, each having a tail end thereof, and the first replaceable creel includes one or more second fiber tows therein, each having a lead end thereof, a method, according to the invention, may include splicing the lead end of at least one of the second fiber tows with a corresponding tail end of at least one of the first fiber tows, using an auto-splice method. The auto-splice method may include assisting an operator in splicing the tail end of a first fiber tow to the lead end of the second fiber tow, by performing the splicing operation with an auto-splice apparatus having an operator actuated welding device for clamping together and applying heat to overlapped portions of the tail end of the first fiber tow and the lead end of the second fiber tow.

In an auto-splice method, according to the invention, the operator may initiate a first phase of the splicing process, performed by the auto-splice apparatus, in which the auto-splice apparatus sequentially clamps the tail end of the first tow extending from the fiber placement head, and trims the tail end of the first tow to a desired length to form a trimmed tail end of the first tow. The operator may then feed the lead end of the second tow into the auto-splice apparatus, with the auto-splice apparatus guiding the lead end into an overlapped position adjacent the trimmed tail end of the first fiber tow, to form overlapped portions of the first and second fiber tows. The operator may then initiate a second phase of the splicing process, performed by the auto-splice apparatus, in which the auto-splice apparatus welds together the overlapped portions of the first and second fiber tows, and then unclamps the tail end of the first fiber tow.

Some forms of the invention may include, removing the first replaceable creel from the fiber placement machine by: aligning the first replaceable creel attached to the fiber placement machine with a creel support structure; supporting the first replaceable creel with the support structure; detaching the first replacement creel from the fiber placement machine; and moving the first replaceable creel out of alignment with the fiber placement machine. The support structure may be located at a creel exchange location, with the invention further including moving the fiber placement machine to the creel exchange location. The invention may further include replenishing the first creel while it is detached from the fiber placement machine.

In some forms of the invention, where a plurality of first fiber tows are being fed from first reels of the first fiber tows located within the first creel, to a fiber placement head of a fiber placement machine, the invention may further include sequentially clamping a tail end of each of the first tows, extending from the fiber placement head, and severing the tail end of the first tow at a desired length thereof within the fiber placement machine, to form a trimmed tail end of the first fiber tow.

The invention may include exchanging the first replaceable creel with a second replaceable creel by: aligning the first replaceable creel attached to the fiber placement machine with a creel support structure; supporting the first replaceable creel with the support structure; detaching the first replaceable creel from the fiber placement machine; moving the first replaceable creel out of alignment with the fiber placement machine; supporting a second replaceable creel in an alignment position; aligning the second replaceable creel with the fiber placement machine; and attaching the second replaceable creel to the fiber placement machine. The support structure may be located at a creel exchange location. Where the support structure is located at a creel exchange location, the invention may further include, moving the fiber placement machine to the creel exchange location.

Where the second creel is supported in the alignment position at a creel exchange location, the invention may include moving the fiber placement machine to the creel exchange location. The first creel may be replenished while it is detached from the fiber placement machine. The fiber placement machine may be operated with the multiple second fiber tows being supplied from the second replaceable creel, while the first replaceable creel is detached.

Where the first and second creels contain one or more spools of fiber tows which are consumed during the fiber placement process, with at least one of the spools in the second creel containing a fiber tow differing from the material or configuration of a corresponding fiber tow in the first creel, the invention may include exchanging the second creel for the first creel to replace the corresponding fiber tow in the first creel with at least one fiber tow of differing material or configuration, at a pre-determined point in the fiber placement process.

Where the first and second replaceable creels contain one or more spools of fiber tows which are consumed during the fiber placement process, the invention may include exchanging the second creel for the first creel, when at least one of the spools of fiber tows in the first creel has reached a low material condition. The first creel may then be replenished while it is detached from the fiber placement machine.

Where the fiber placement machine has one or more first fiber tows therein, each having a tail end thereof and being supplied from a separate first reel of the first fiber tow located within the first creel, and the second replacement creel includes one or more second fiber tows therein, each having a lead end thereof and being supplied by a separate reel of second fiber tow located within the second creel, the invention may include splicing the head end of at least one of the second fiber tows with a corresponding tail end of at least one of the first fiber tows, using an auto-splice method.

In an auto-splice method, according to the invention, the auto-splice method is performed with an auto-splice apparatus. The auto-splice apparatus may have a first half thereof, fixedly attached to the fiber placement machine for clamping and trimming the tail end of the first tow, and for welding the overlapped portions of the first and second tows. The auto-splice apparatus may have multiple second halves thereof, with one of the multiple second halves being fixedly attached to the first creel, and another of the multiple second halves being fixedly attached to the second creel. The first and second halves may be configured for clamping the respective lead ends of the first and second tows within the first and second creels respectively, when the first and second creels are not operatively connected to the fiber placement machine. The second halves may be further configured for feeding the lead ends of the first and second fiber tows, respectively, into the first half of the auto-splice apparatus, when the respective first or second creel is operatively attached to the fiber placement machine.

In forms of the invention utilizing an auto-splice apparatus, a method, according to the invention, may include clamping the respective lead ends of the first and second tows within the first and second creels respectively, when the first and second creels are not operatively connected to the fiber placement machine. A method, according to the invention, may further include feeding the lead end of the second fiber tow into the first half of the auto-splice apparatus, with the second creel operatively attached to the fiber placement machine, to form overlapped portions of the lead end of the second tow and the tail end of the first tow. The overlapped portions of the first end second tows may then be welded together. The tail end of the first fiber tow may be unclamped after welding together the overlapped portions of the first and second fiber tows.

Where the fiber placement machine is receiving multiple first tows from multiple first reels of the first creel, the invention may further include, simultaneously clamping and trimming all of the first fiber tows, prior to detachment of the first creel from the fiber placement machine.

An auto-splice method, used in practicing the invention, may include assisting an operator in splicing the tail end of the first fiber tow to the lead end of the second fiber tow, by performing the splicing operation with an auto-splice apparatus, having an operator actuated welding device for clamping together and applying heat to overlapped portions of the tail end of the first fiber tow and the lead end of the second fiber tow. The auto-splice method may include, having the operator initiate a first phase of the splicing process, performed by the auto-splice apparatus, in which the auto-splice apparatus sequentially clamps the tail end of the first tow, extending from the fiber placement head, and trims the tail end of the first tow to a desired length to form a tail end of the first tow. The operator may then feed the lead end of the second tow into the auto-splice apparatus, with the auto-splice apparatus guiding the lead end into an overlapped position adjacent the trimmed tail end of the first fiber tow, to form overlapped portions of the first and second fiber tows. The operator may then initiate a second phase of the splicing process, performed by the auto-splice apparatus, in which the auto-splice apparatus welds together the overlapped portions of the first and second fiber tows, and then unclamps the tail end of the first fiber tow.

An auto-splice apparatus, for assisting an operator in performing a splicing process, according to the invention, may have a first half thereof, fixedly attached to the fiber placement machine for clamping and trimming the tail end of the first tow, and for welding the overlapped portions of the first and second tows. The auto-splice apparatus may have multiple second halves thereof, with one of the multiple second halves being fixedly attached to the first creel and another of the multiple second halves being fixedly attached to the second creel. The second halves may be configured for clamping the respective lead ends of the first and second tows within the first and second creels respectively, when the first and second creels are not operatively connected to the fiber placement machine. The second halves may be further configured for feeding the lead ends of the first and second fiber tows respectively into the first half of the auto-splice apparatus when the respective first or second creels are operatively attached to the fiber placement machine.

A method, according to the invention, for assisting an operator in the splicing process, may include clamping the respective lead ends of the first and second tows within the first and second creels respectively, when the first and second creels are not operatively connected to the fiber placement machine. The invention may also include feeding the lead end of the second fiber tow into the first half of the auto-splice apparatus, when the second creel is operatively attached to the fiber placement machine, and the second phase of the auto-splice process is initiated. Where the fiber placement head is receiving multiple first tows from multiple first reels of the first creel, with the second creel including multiple second reels for feeding multiple second fiber tows to the fiber placement head, the first phase of the splicing process, according to the invention, may include simultaneously clamping and trimming all of the first fiber tows, prior to detachment of the first creel from the fiber placement machine.

Some forms of the invention include an auto-splice apparatus, and a method for using an auto-splice apparatus, for assisting an operator in splicing the tail end of a first fiber tow to the lead end of a second fiber tow, where the first fiber tow is being fed from a first reel of the first fiber tow to a fiber placement head of a fiber placement machine, and the second fiber tow is being fed from a second reel of the second fiber tow, with the auto-splice apparatus including, an operator actuated welding device for clamping together and applying heat to overlapped portions of the tail end of the first fiber tow and the lead end of the second fiber tow.

In one form of the invention, a method for assisting an operator in splicing the tail end of a first fiber tow to the lead end of a second fiber tow, using an auto-splice apparatus, according to the invention, includes the operator initiating a first phase of the splicing process, performed by the auto-splice apparatus, in which the auto-splice apparatus sequentially clamps the tail end of the first tow extending from the fiber placement head, and trims the tail end of the first tow to a desired length to form a trimmed tail end of the first tow. The operator then feeds the lead end of the second tow into the auto-splice apparatus, with the auto-splice apparatus guiding the lead end into an overlapped position adjacent the trimmed tail end of the first fiber tow, to form overlapped portions of the first and second fiber tows. The operator then initiates a second phase of the splicing process, performed by the auto-splice apparatus, in which the auto-splice apparatus welds together the overlapped portions of the first and second tows, and then unclamps the tail end of the first fiber tow.

A method, according to the invention, may also include detecting a low material condition in the first reel of the fiber tow, and stopping the feed of the first fiber tow to the fiber placement head prior to initiating the first phase of the splicing process. The method may further include re-starting the feed of the trimmed tail end of the first fiber tow, having the second fiber tow welded thereto, to the fiber placement head, following completion of the second phase of the splicing process.

Where the first reel is operatively mounted within a creel operatively attached to the fiber placement head, a method, according to the invention, may include having the operator replace the first reel with a second reel, by removing the first reel and operatively mounting the second reel within the creel in place of the first reel, between the first and second phases of the splicing process.

Where the first and second reels are separately operatively mounted within a creel operatively attached to the fiber placement head, with only the first reel being operatively connected to the fiber placement head prior to initiating the splicing process, a method, according to the invention, may further include having the operator feed the lead end of the second fiber tow into the auto-splice apparatus, between the first and second phases of the splicing process.

In some forms of the invention, welding the overlapped portions of the first and second fiber tows together may include the steps of: clamping the overlapped portions of the first and second fiber tows together between a welding head and a support surface with a clamping pressure; applying heat to the overlapped portions with the welding head, for a period of time, to thereby weld the overlapped portions together; and, unclamping the overlapped portions following completion of the weld. The invention may further include controlling one or more of the clamping pressure, the heat applied by the welding head, and/or the period of time, to desired values thereof. Welding the overlapped portions of the first and second fiber tows together, according to the invention, may also include cooling the overlapped portions subsequent to forming the weld.

Where the first reel is operatively mounted in a first creel, and the second reel is operatively mounted in a second creel, with the first and second creels being configured for operative alternate attachment to the fiber placement machine, the invention may further include detaching the first creel from the fiber placement machine and operatively attaching the second creel to the fiber placement machine in place of the first creel. The invention may further include operating the fiber placement machine with a second fiber tow from the second creel, while the first creel is detached from the fiber placement machine. The invention may also include replenishing the first creel, with different first reels of first fiber tows, while the first creel is detached from the fiber placement machine.

In forms of the invention utilizing interchangeable first and second creels, an auto-splice apparatus, according to the invention, may have a first half thereof disposed within the fiber placement machine for clamping and trimming the tail end of the first tow, and for welding the overlapped portions of the first and second tows. The auto-splice apparatus may also have multiple second halves thereof, with one of the multiple second halves being disposed in the first creel and another of the multiple second halves being disposed in the second creel. The second halves may be configured for clamping the respective lead ends of the first and second tows within the first and second creels respectively, when the first and second creels are not operatively connected to the fiber placement machine. The second halves may be further configured for feeding the lead ends of the first and second fiber tows, respectively, into the first half of the auto-splice apparatus, when the respective first or second creel is operatively attached to the fiber placement machine.

The respective lead ends of the first and second tows, within the first and second creels respectively, may be clamped by the second halves of the auto-splice apparatus, when the first and second creels are not operatively connected to the fiber placement machine. The second halves of the auto-splice apparatus may also feed the lead ends of the first and second fiber tows, respectively, into the first half of the auto-splice apparatus, when the respective first or second creel is operatively attached to the fiber placement machine, and the second phase of the auto-splice process is initiated.

In forms of the invention where the fiber placement head is receiving multiple first tows from multiple first reels of the first creel, and where the second creel includes multiple second reels for feeding multiple second fiber tows to the fiber placement head, the first phase of the splicing process, according to the invention, may include, simultaneously clamping and trimming all of the first fiber tows, prior to detachment of the first creel from the fiber placement machine. In other forms of the invention, all of the first fiber tows may be sequentially clamped and trimmed, prior to detachment of the first creel from the fiber placement machine.

In some forms of the invention, a single auto-splice apparatus, according to the invention, may be movable, between multiple tows fed from a creel, for performing the splicing process, according to the invention.

One form of an auto-splice apparatus, according to the invention, includes an operator actuated welding device, for clamping together and applying heat to overlapped portions of the tail end of the first fiber tow and the lead end of the second fiber tow.

In an auto-splice apparatus, according to the invention, for assisting an operator in splicing the tail end of a first fiber tow to the lead end of a second fiber tow, wherein the first fiber tow is being fed from a first reel of the first fiber tow to a fiber placement head of the fiber placement machine, and the second fiber tow is being fed from a second reel of the second fiber tow, the auto-splice apparatus may include a tail end clamping device, a tail end trimming device, a welding device, and a two-position operator activated control element operatively connecting the tail end clamping device, the tail end trimming device, and the welding device.

The tail end clamping device, the tail end trimming device, the welding device, and the two-position operator activated control element may be operatively disposed and interconnected in such a manner that, when the operator moves the control element from the first position to the second position thereof, the auto-splice apparatus initiates a first phase of a sequential automated splicing process, in which the tail end clamping device clamps the tail end of the first tow, extending from the fiber placement head, and the tail end trimming device trims the tail end of the first tow to a desired length to form a trimmed tail end of the first fiber tow.

The tail end clamping device, the tail end trimming device, the welding device, and the two position operator activated control element may also be operatively disposed and interconnected in such a manner that, following the first phase of the splicing process, the operator may feed the lead end of the second fiber tow into the auto-splice apparatus, with the auto-splice apparatus guiding the lead end into an overlapped position adjacent the trimmed tail end of the first fiber tow, to form overlapped portions of the first and second fiber tows.

The tail end clamping device, the tail end trimming device, the welding device, and the two-positioned operator activated control element may be further operatively disposed and interconnected in such a manner that, following insertion of the lead end of the second fiber tow into the auto-splice apparatus, the operator can move the control element back to the first position thereof, for initiating a second phase of the splicing process, by the auto-splice apparatus, in which the welding device of the auto-splice apparatus welds together the overlapped portions of the first and second fiber tows, and then unclamps the tail end clamping device, to release the tail end of the first fiber tow having the lead end of the second fiber tow welded thereto.

A welding device, in an auto-splice apparatus, according to the invention, may include a welding head and a support surface, with the welding head and support surface being configured in a complimentary manner for clamping overlapped portions of the first and second fiber tows together between the welding head and the support surface with a clamping pressure. The welding head may also be configured for applying heat to the overlapped portions, for a period of time, to thereby weld the overlapped portions together. The welding head may be further configured for unclamping the overlapped portions of the first and second tows following completion of the weld. The welding device may also be configured for cooling the overlapped portions of the first and second fiber tows, subsequent to forming the weld. An auto-splice apparatus, according to the invention, may further include a welding controller, operatively connected for controlling one or more of: the clamping pressure; the heat applied by the welding head; the period of time that heat is applied by the welding head; and/or cooling of the overlapped portion, subsequent to forming the weld.

In an auto-splice apparatus and/or method, according to the invention, a back-up tow is attached to a distal end of an original tow, with a splice unit, in such a manner that it is not necessary to interrupt the fiber placement process to splice in a tow from a new spool of material when the original tow material on an original spool is consumed in the winding process. An apparatus and/or method, according to the invention may include attaching the back-up tow to the distal end of the original tow with a splice unit. Sensors, such as tow tension sensors or presence sensors, may be utilized for triggering and controlling the auto-splice process. An apparatus, according to the invention, may include elements such as guides, compression elements, and cooling equipment, in addition to heating and sensing elements.

An auto-splice apparatus and/or method, according to the invention, may be utilized for auto-splicing a single tow, multiple tows, or in a mass auto-splice mode which allows automatic changing of an entire creel of fiber tows, without rethreading tows through a fiber placement head.

Other aspects, objects and advantages of the invention will be apparent upon consideration of the following description of exemplary embodiments of the invention in conjunction with the accompanying drawings and attachments.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 4-12 are schematic illustrations of exemplary embodiments of auto-splice apparatuses and methods which are used to facilitate disconnection and reconnection of fiber tows as the replaceable creels are interchanged, according to the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
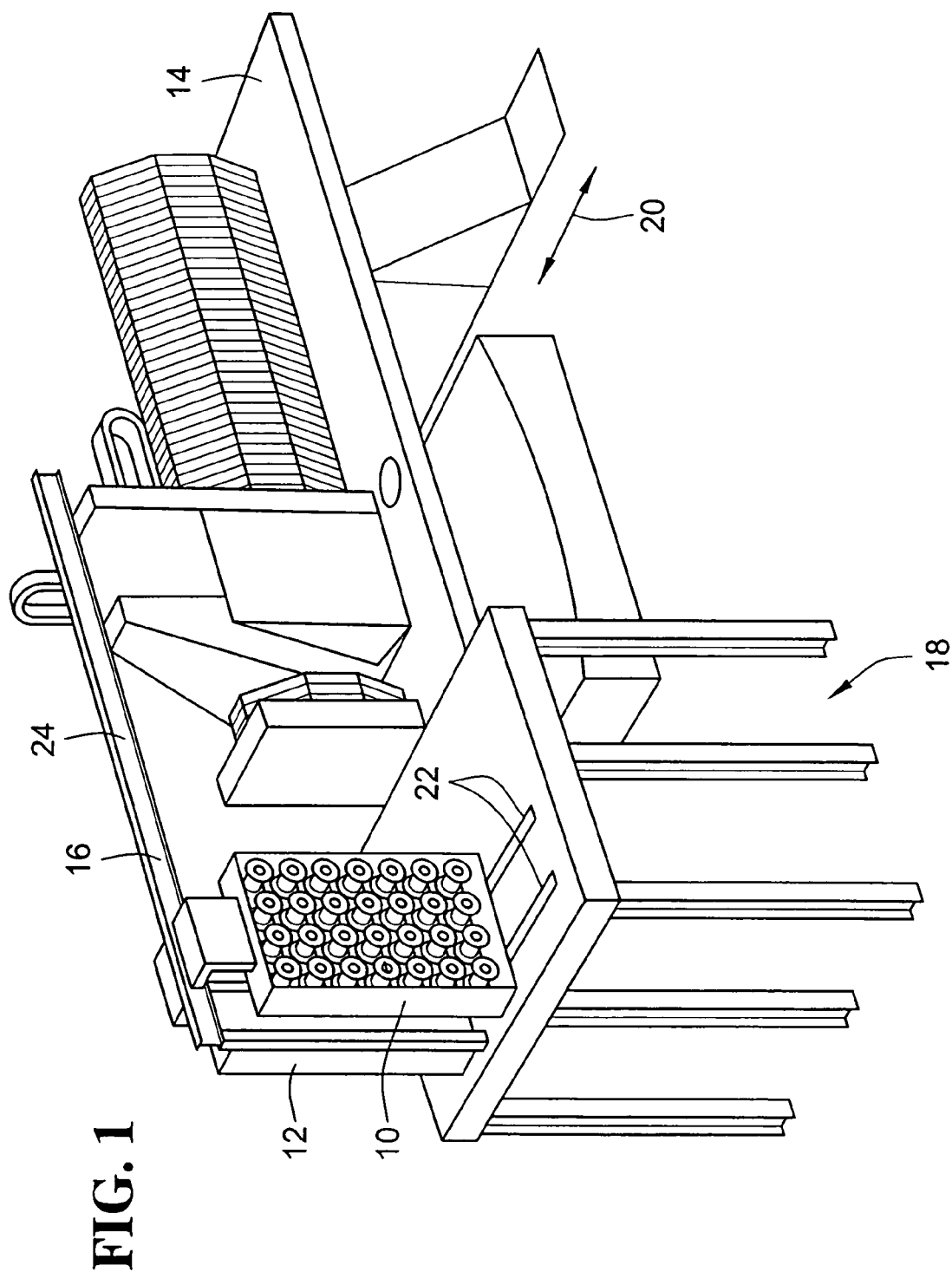
FIGS. 1-3 illustrate exemplary embodiments of an apparatus and method, according to the invention, for operating a fiber placement machine, during a fiber placement process, with replaceable creels.
Figure 2:
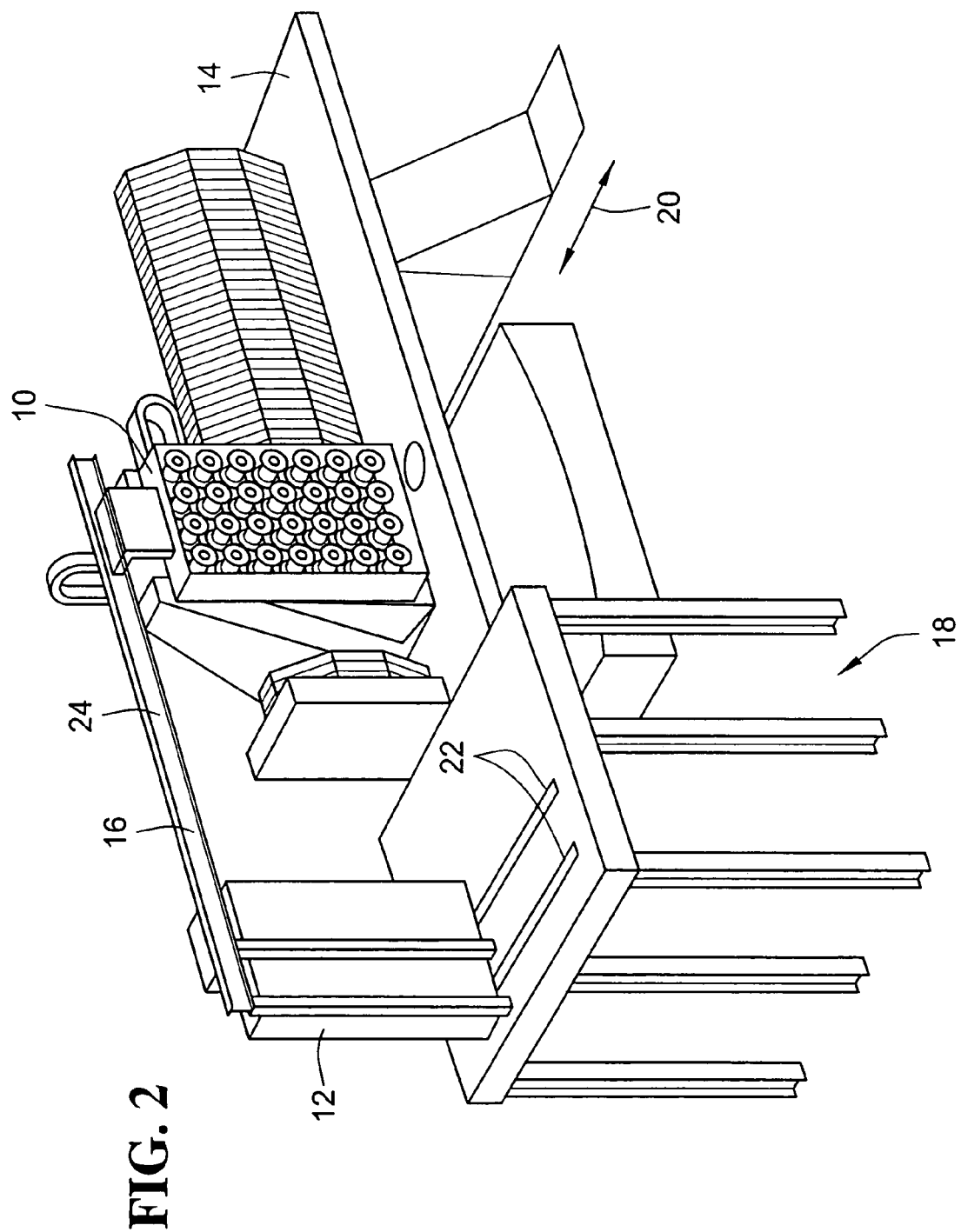
Figure 3:
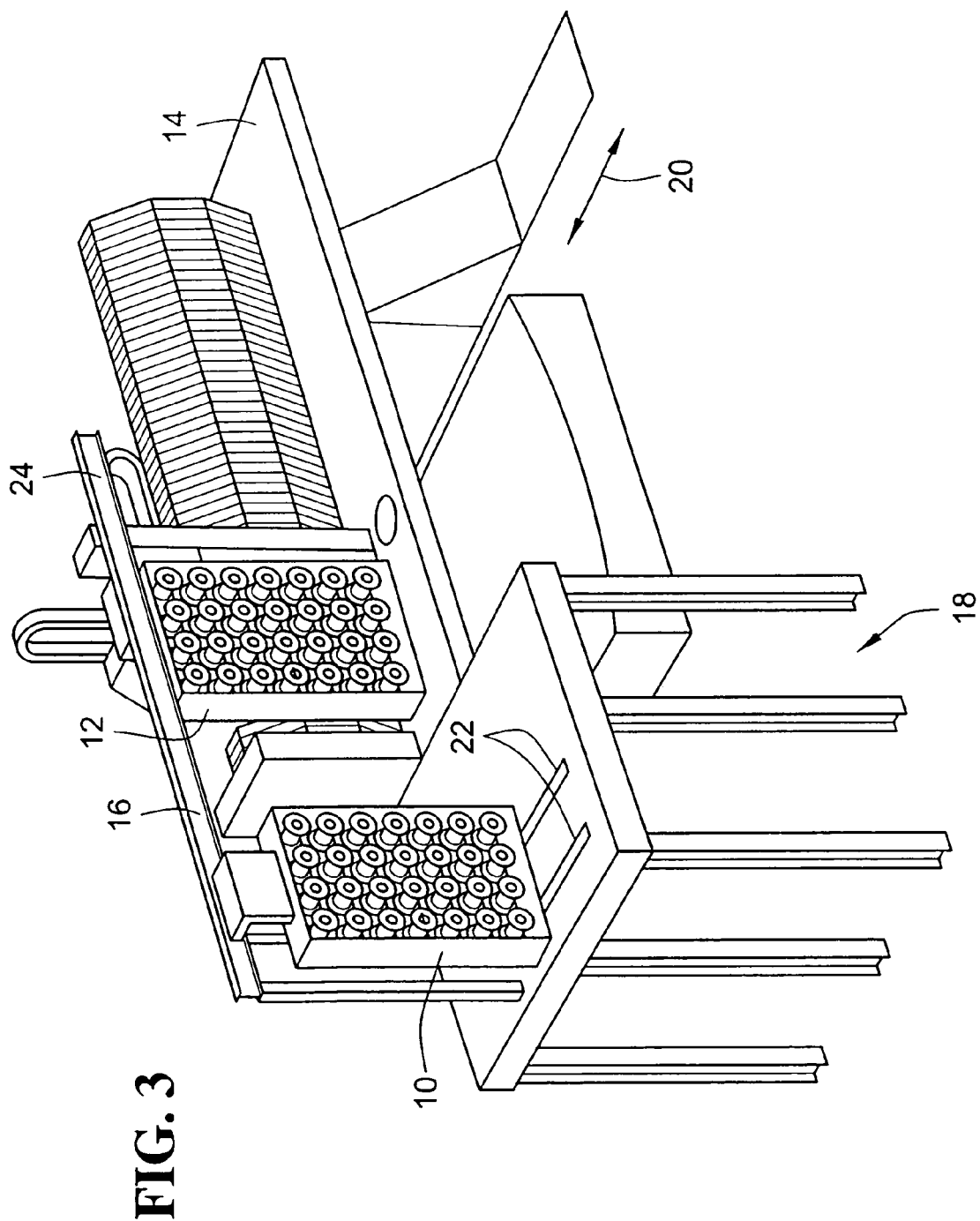

FIGS. 1-3 illustrate an exemplary embodiment of the invention, in which a first or a second replaceable creel 10, 12 may be alternately aligned with and attached to a fiber placement machine 14, for feeding fiber tows to a fiber placement head (not shown) of the fiber placement machine 14 during a fiber placement process.

FIG. 1 shows both the first and second replaceable creels 10, 12 removed from the fiber placement machine 14, and supported by a common support structure 16 of the first and second creels 10, 12, at a creel exchange location 18, along a path of travel 20 of the fiber placement machine 14.

The creel exchange station 18 includes tracks 22, for moving the first and second replaceable creels 10, 12 into engagement with an overhead boom 24 of the creel support structure 16. In the exemplary embodiment, the first and second creels 10, 12, the creel support structure 16, and the tracks 22 are configured such that a single creel support structure 16 can support both the first and second creels 10, 12, on opposite sides of the overhead boom 24, when both the first and second creels 10, 12 are detached from the fiber placement machine 14. In other embodiments of the invention, it will be understood that other arrangements may be utilized for supporting and aligning single or multiple replaceable creels with the fiber placement machine 14.

As shown in FIG. 2, when it is desired to attach the first replaceable creel 10 to the fiber placement machine 14, the fiber placement machine 14 is moved to a first creel loading position, along the path 20 of the fiber placement machine 14, which is aligned with the overhead boom 24 in such a manner that the first replaceable creel 10 can be moved along the overhead boom 24 into an alignment position with the fiber placement machine 14 and operatively attached to the fiber placement machine 14. The first replaceable creel 10 is then detached from the creel support structure 16, to be fully supported by and movable with the fiber placement machine 14.

As part of the process of operatively attaching the first replaceable creel 10 to the fiber placement machine 14, fiber tows being fed from the first creel 10 must be fed into and threaded through the fiber placement machine 14, or attached to the tail ends of fiber tows left within the fiber placement machine when a replaceable creel previously attached to the fiber placement machine was removed to have the first replaceable creel 10 exchange therewith. To facilitate the connection of fiber tows within the first replaceable creel 10, or any subsequent replaceable creel, with the tail ends of fiber tows located in the fiber placement machine 14, an auto-splice apparatus, according to the invention, as described in more detail below may be utilized.

At a point in the fiber placement process where one or more of the fiber tows within the first creel 10 have reached a low material condition, or at a point in the process where it is desirable to change to different material configurations or types stored on spools within the second replaceable creel 12, the fiber placement machine 14 once again is moved along the path 20 to the creel exchange location 18, and into alignment with the overhead boom 24, so that the first replaceable creel 10 may be reattached to the overhead boom and removed from the fiber placement machine 14 in a manner which is essentially the reverse of the procedures described above for attaching the first replaceable creel 10 to the fiber placement machine 14.

In the exemplary embodiment of the invention, illustrated in FIGS. 1-3, once the first replaceable creel 10 has been removed from the fiber placement machine 14, the fiber placement machine 14 is moved along the path 20 to a second point of alignment with the overhead boom 24, at which the second replaceable creel 12 can be moved along the overhead boom 24 and into alignment with the fiber placement machine 14, as shown in FIG. 3. The second replaceable creel 12 is then physically and operatively attached to the fiber placement machine 14, and detached from the overhead boom 24, to be supported by, and move with the fiber placement machine 14 during the remainder of a fiber placement process. An auto-splice apparatus and method, according to the invention, may be utilized to facilitate exchanging the second replaceable creel 12 for the first replaceable creel 10, in a manner described in more detail below.

While the fiber placement process is continuing, with one of the first or second replaceable creels 10, 12 supplying fiber tows to the fiber placement machine, the other of the first or second replaceable creels 10, 12 may be reloaded, at the creel exchange location 18. Alternatively, the creel (10 or 12), not currently being utilized in the fiber placement process, may be removed from the creel exchange location 18 to be reloaded elsewhere, and then returned to the creel exchange location 18 at a later time for reattachment to the fiber placement machine 14. It is further contemplated, that in some embodiments of the invention, multiple replaceable creels may be preloaded, for sequential or alternating attachment to the fiber placement machine 14, at appropriate, predetermined, points in the fiber placement process.

Various embodiments of auto-splice apparatuses and methods suitable for use in the present invention are disclosed in a commonly assigned United States patent application Ser. No. 11/509,933, filed concurrently with the patent application for the present invention, and titled: AUTO-SPLICE APPARATUS AND METHOD FOR A FIBER PLACEMENT MACHINE, the disclosure and teachings of which are incorporated herein, by reference, in their entireties.

Figure 4:
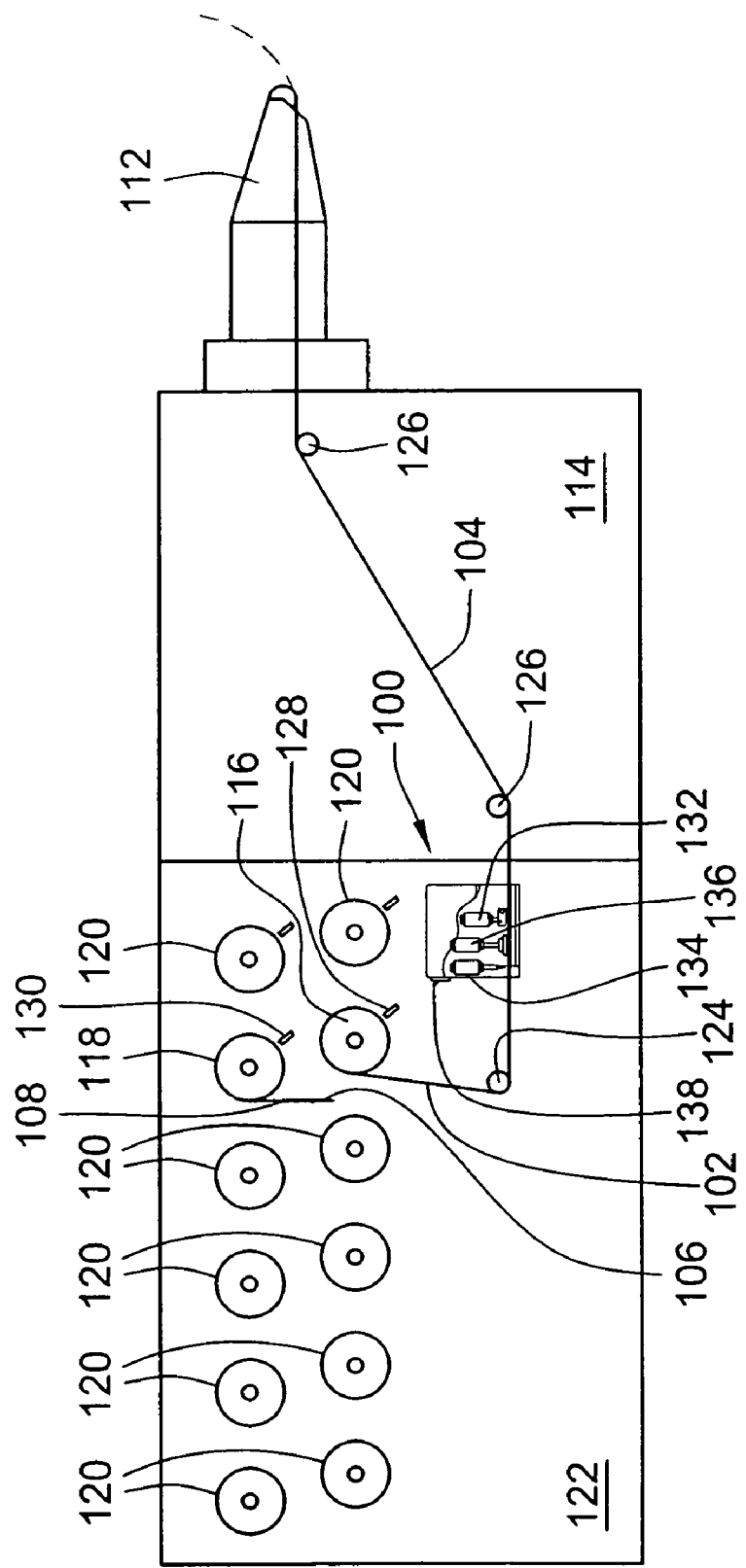

FIG. 4 is a schematic illustration of a first exemplary embodiment of an auto-splice apparatus, which may be used in practicing the invention, for assisting an operator in splicing the tail end 102 of a first fiber tow 104 to the lead end 106 of a second fiber tow 108. The first fiber tow 104 is fed from a first reel 116, containing a coiled portion of the first fiber tow 102, to a fiber placement head 112 of a fiber placement machine 114. The second fiber tow 108 is fed from a second reel 118, containing a coiled portion of the second fiber tow 108. The first and second reels 116, 118, together with a plurality of other reels 120, are operatively mounted within a creel 122, which is operatively and fixedly attached to the fiber placement machine 114, in the schematic illustration of the first exemplary embodiment of the invention 100, as shown in FIG. 1.

Alternate exemplary embodiments of an auto-splice apparatus and method which are particularly suited to use with replaceable creels are described below. The structure and operation of the auto-splice apparatuses, used with multiple creels are similar to those described in relation to the first embodiment of the auto-splice apparatus 100.

The creel and the fiber placement machine include a plurality of other tensioning and redirecting devices, illustrated in FIG. 4 by re-direct rollers 124, 126, in the creel 122 and fiber placement head 114, respectively. The first exemplary embodiment of the invention 100, as shown in FIG. 4, also includes a first and second low material sensor 128, 130, operatively disposed and configured for detecting a low material condition of the first and second reels 116, 118, respectively.

The first exemplary embodiment of the auto-splice apparatus 100, includes a tail end clamping device 132, a tail end trimming device 134, a welding device 136, and a two-position, operator activated, control element, represented by a toggle switch 138 which operatively interconnects the tail and clamping device 132, the tail end trimming device 134, and the welding device 136.

Operation of the first exemplary embodiment of the auto-splice apparatus 100, will be described in conjunction with FIGS. 5-9 which are enlarged illustrations of a portion of the elements illustrated in FIG. 4, sequentially showing various steps of a method, according to the invention, for operating the auto-splice apparatus 100.

Figure 5:
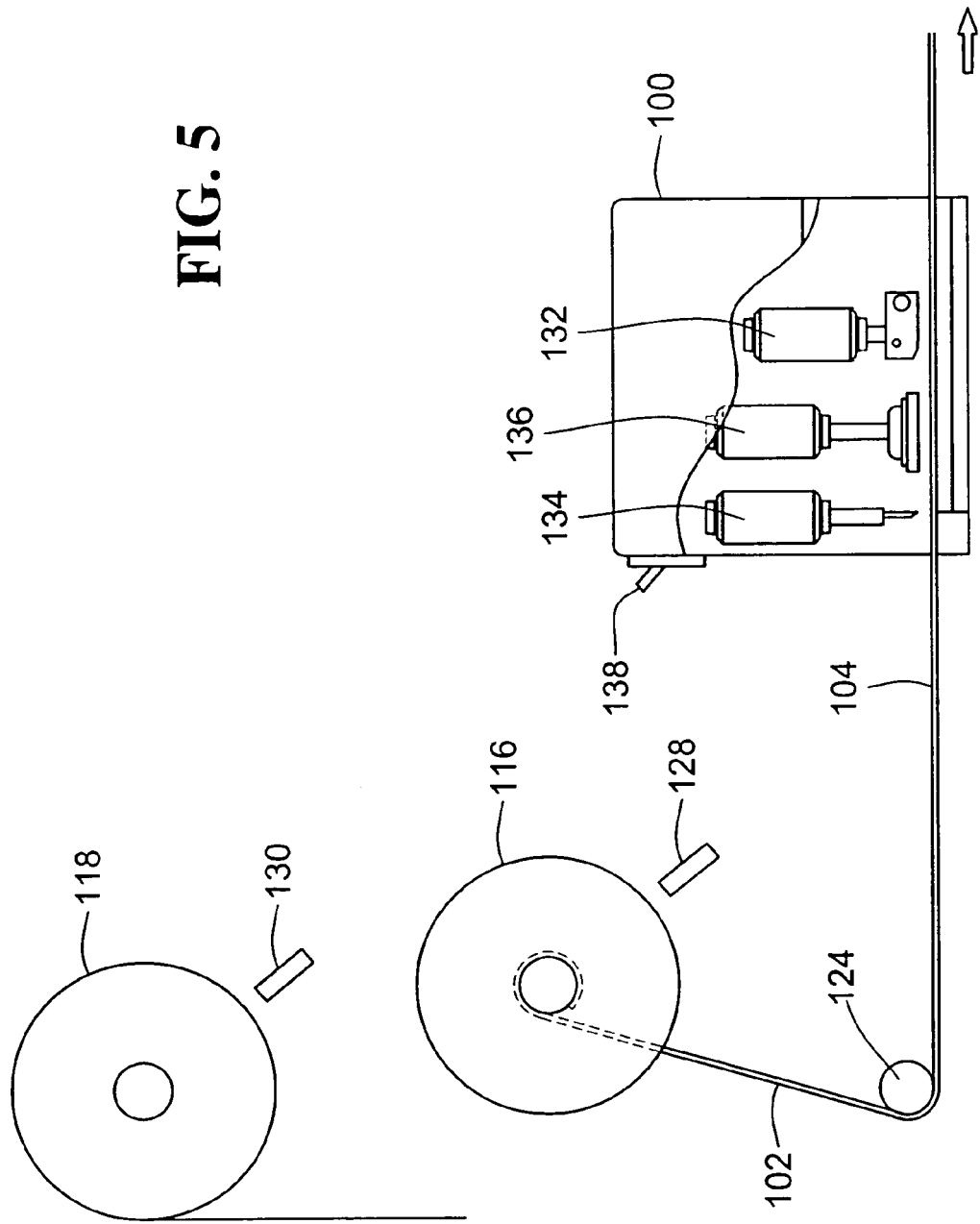

FIG. 5 illustrates an operating condition in which the low material sensor 128 has detected a low material condition in the first reel 110, where the coiled portion of the first fiber tow 104, on the reel 116, is nearly exhausted, and the tail end 102 of the first fiber tow 104 is approaching the auto-splice apparatus 100, as the first fiber tow 104 is fed out to the fiber placement head 112.

When such a low material condition is detected, with regard to the first fiber tow 104, the operator of the fiber placement machine 114 stops the feed of the first fiber tow 104 to the fiber placement 114, prior to initiating a first phase of the splicing process.

Figure 6:
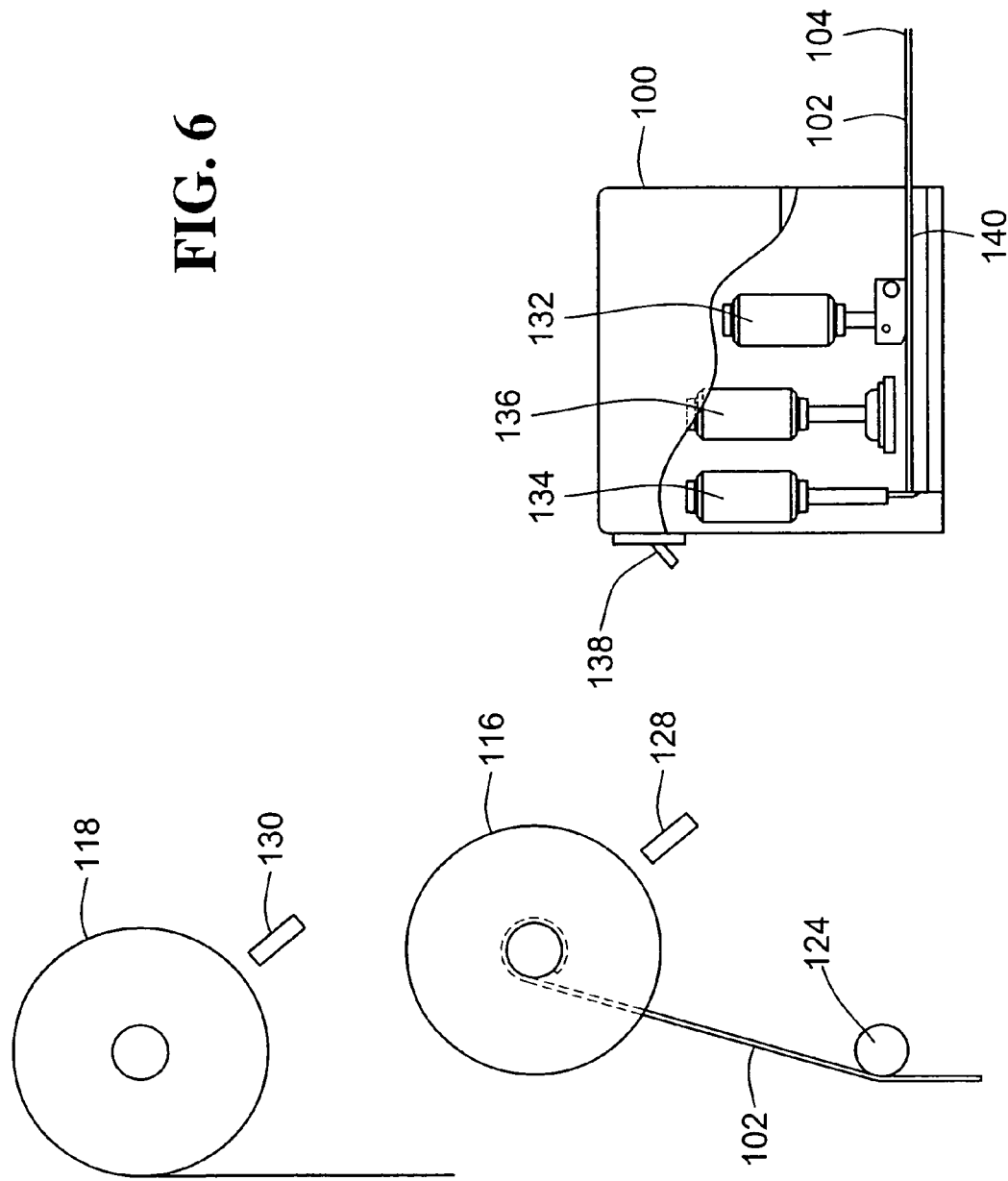

To initiate the first phase of the splicing process, the operator moves the toggle switch 138, from the first position as shown in FIG. 5, to the second position, as shown in FIG. 6. Once the toggle switch 138 is moved to the second position, by the operator, the auto-splice apparatus 100 performs the first phase of the splicing process, in which the tail end clamping device 138 clamps the tail end 102 of the first tow 104 (which extends through the fiber placement machine 114 and remains attached to the fiber placement head 112) in such a manner that the tail end clamping device 138 retains the tail end 102 within the auto-splice apparatus 100. The tail end trimming device 134, of the auto-splice apparatus 100, is then automatically actuated, as part of the first phase of the splicing process, to trim the tail end 102 of the first tow to a desired length, and then retract, to form a trimmed tail end 140 of the first fiber tow 104, to thereby complete the first phase of the splicing process. In some embodiments of the invention, the auto-splice apparatus 100 may be configured to provide a time delay between actuation of the tail end clamping device and actuation of the tail end trimming device, during the first phase of the splicing process.

Figure 7:
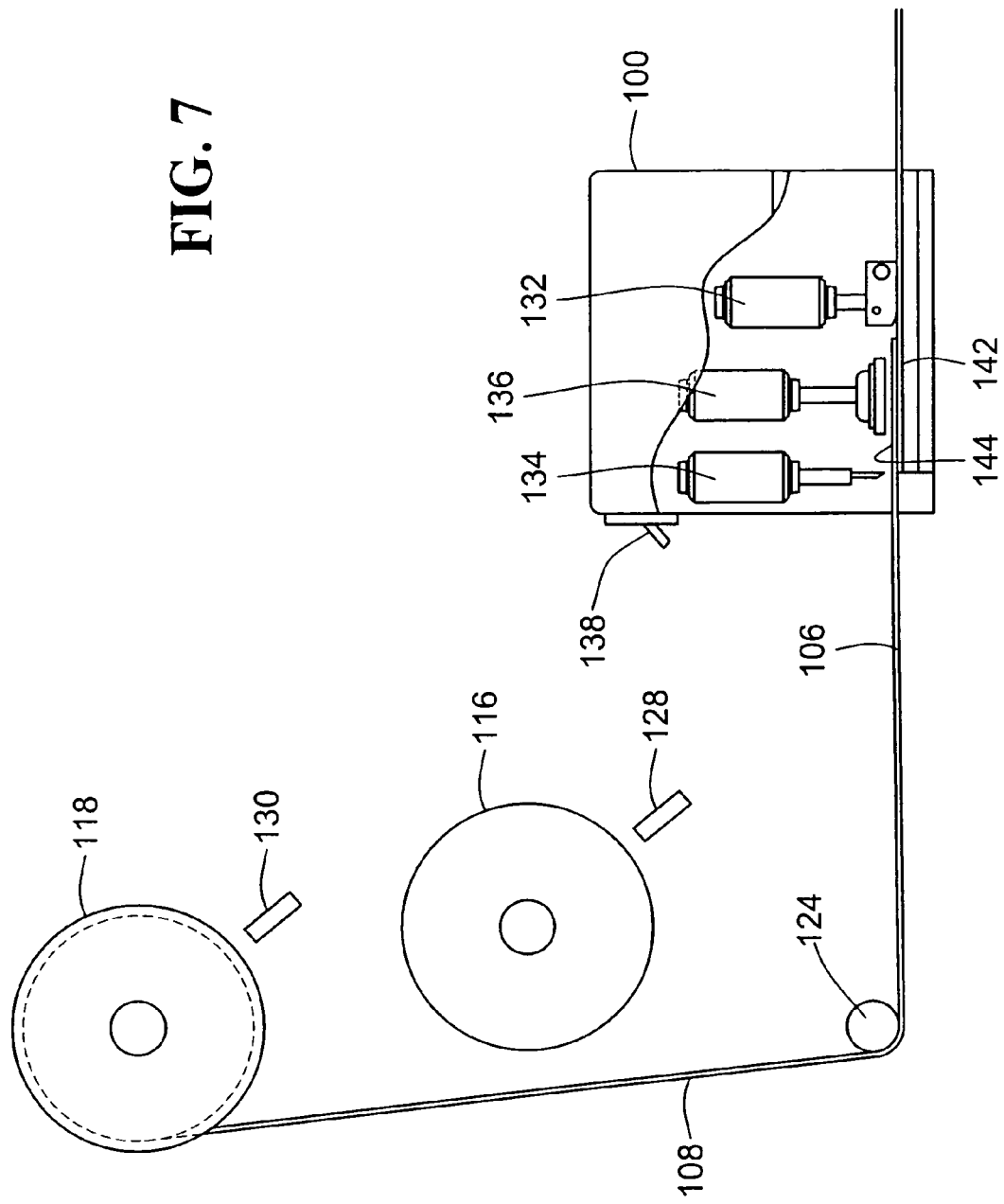

As shown in FIG. 7, following completion of the first phase of the splicing process, the operator inserts the lead end 106 of the second fiber tow 108 into the auto-splice apparatus 100, and the auto-splice apparatus 100 guides the lead end 106 into an overlapped position, adjacent the trimmed tail end 140 of the first fiber tow 104, to form overlapped portions 142, 144 of the first and second fiber tows 104, 108, respectively.

It will be noted, that according to the invention, so long as the toggle switch 138 is left in the second position by the operator, the auto-splice apparatus 100 will not perform the second phase of the splicing process, and will stay indefinitely at the end of the first phase of the splicing process, until the operator moves the toggle switch 138 from the second position to the first position thereof. The auto-splice apparatus 100 therefore provides however much time the operator may need to thread the lead end 106 of the second fiber tow 108 through any redirects 124, or tensioning devices may be present in the creel 122, and inserting the lead end 106 into the auto-splice apparatus 100.

It will be further noted, that although in the embodiment illustrated in the figures and disclosed thus far, the second fiber tow 108 is supplied by a second reel 118, which is already present within the creel 122, the invention may also be practiced by removing the first reel, after the tail end trimming device 134 severs the first fiber tow 104, and mounting a second reel 118, taken from storage outside of the creel, for example, on the drive mechanism upon which the first reel was mounted prior to becoming exhausted.

Figure 8:
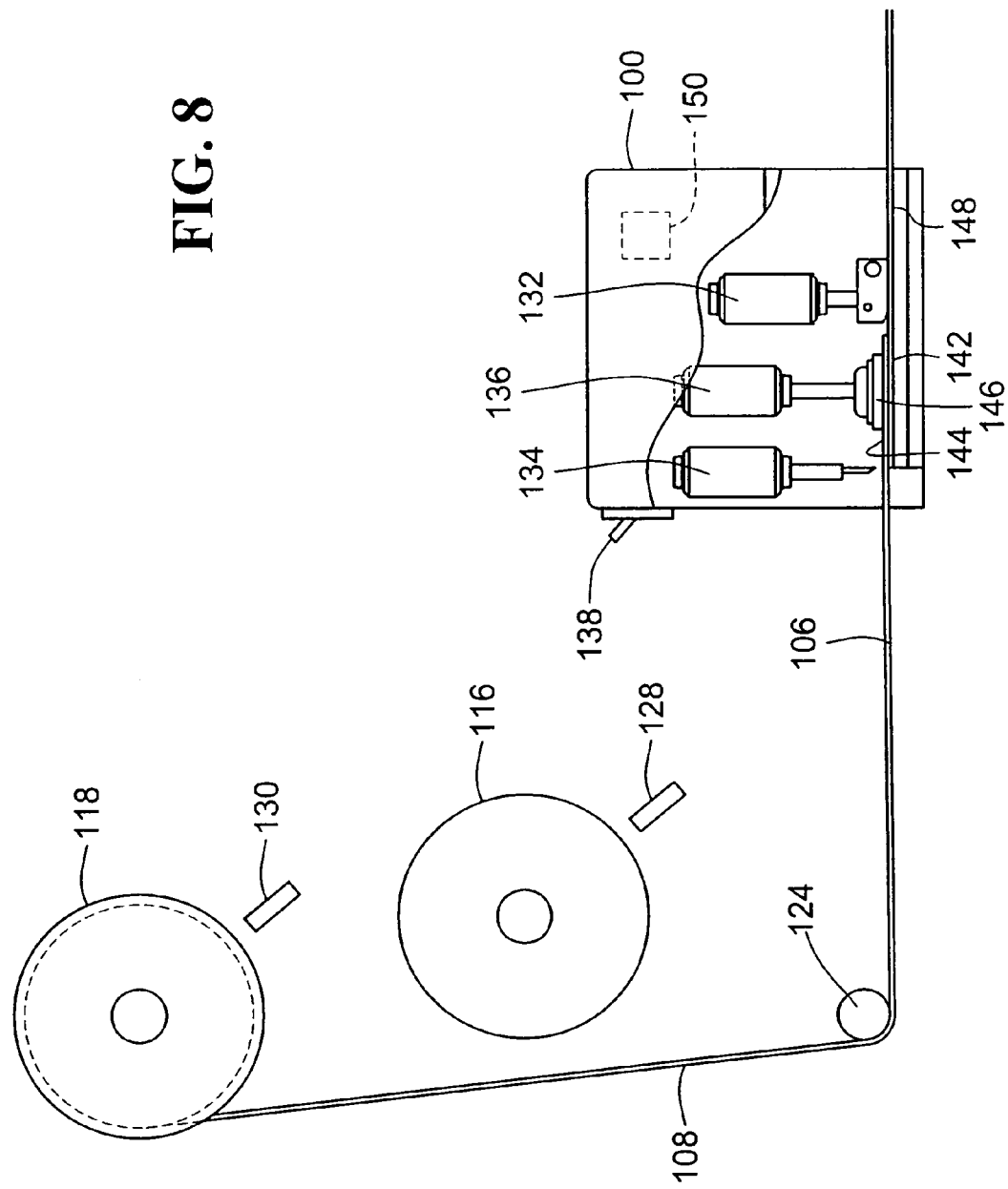

As shown in FIG. 8, once the operator has completed threading of the second fiber tow 108 through the redirects 124 and tensioning devices within the creel 122 and insertion of the lead end 106 of the second fiber tow 108 into the auto-splice apparatus 100, the operator moves the toggle switch 138 back to the first position, to initiate a second phase of the splicing process by the auto-splice apparatus 100, in which a welding head 146 of the welding device 136 clamps the overlapping portions 142, 144 of the first and second fiber tows 104, 108 against a support surface 148, of the auto-splice apparatus 100, with a clamping pressure. The welding head 146 then applies heat to the overlapped portions 142, 144, for a period of time, to thereby weld the overlapped portions 142, 144 together. After the welding head 146 has applied heat to the overlapped portions 142, 144, for a desired period of time, the auto-splice apparatus 100 moves the welding head 146 away from the support surface 148 to unclamp the welded together overlapped portions 142, 144 of the first and second tows 104, 108, to thereby complete the second phase of the splicing process.

In some forms of the invention, the welding device 136 may be further configured for cooling the overlapped portions 142, 146 of the first and second fiber tows 104, 108, subsequent to forming the weld, as part of the second phase of the splicing process.

Figure 9:
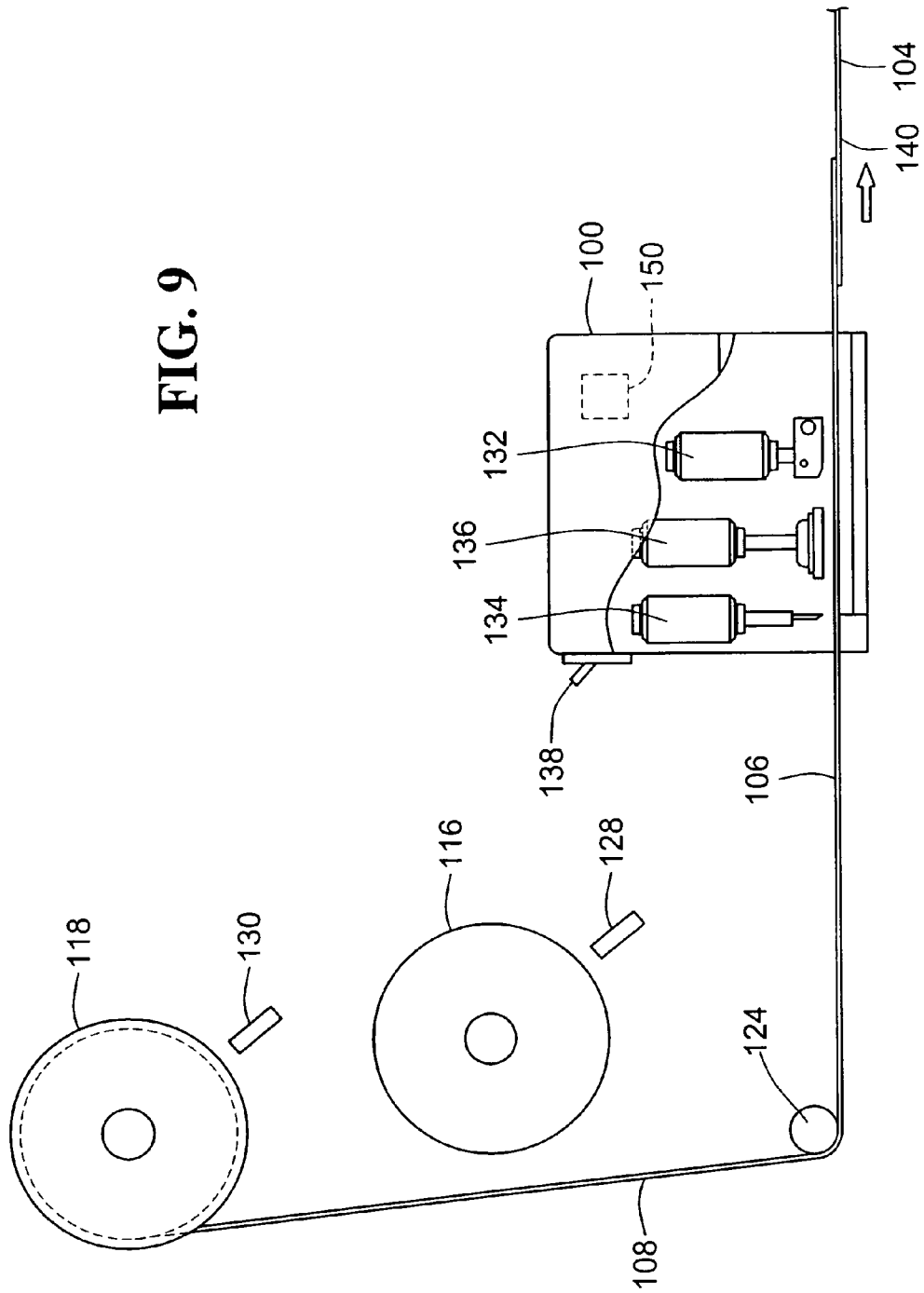

As shown in FIG. 8, the first exemplary embodiment of the auto-splice apparatus 100, according to the invention, also includes a welding controller 150, operatively connected for controlling one or more parameters of the welding process, such as the clamping pressure, the heat applied by the welding head, the period of time that the heat is applied, and/or the cooling of the overlapped portions 142, 144 of the first and second fiber tows 104, 108, subsequent to forming the weld. As indicated in FIG. 9, once the auto-splice apparatus 100 completes the second phase of the splicing process, the operator restarts the fiber placement machine 114, to feed the trimmed tail end 140 of the first fiber tow 104, which now has the lead end 106 of the second fiber tow welded thereto, to the fiber placement head 112.

Figure 10:
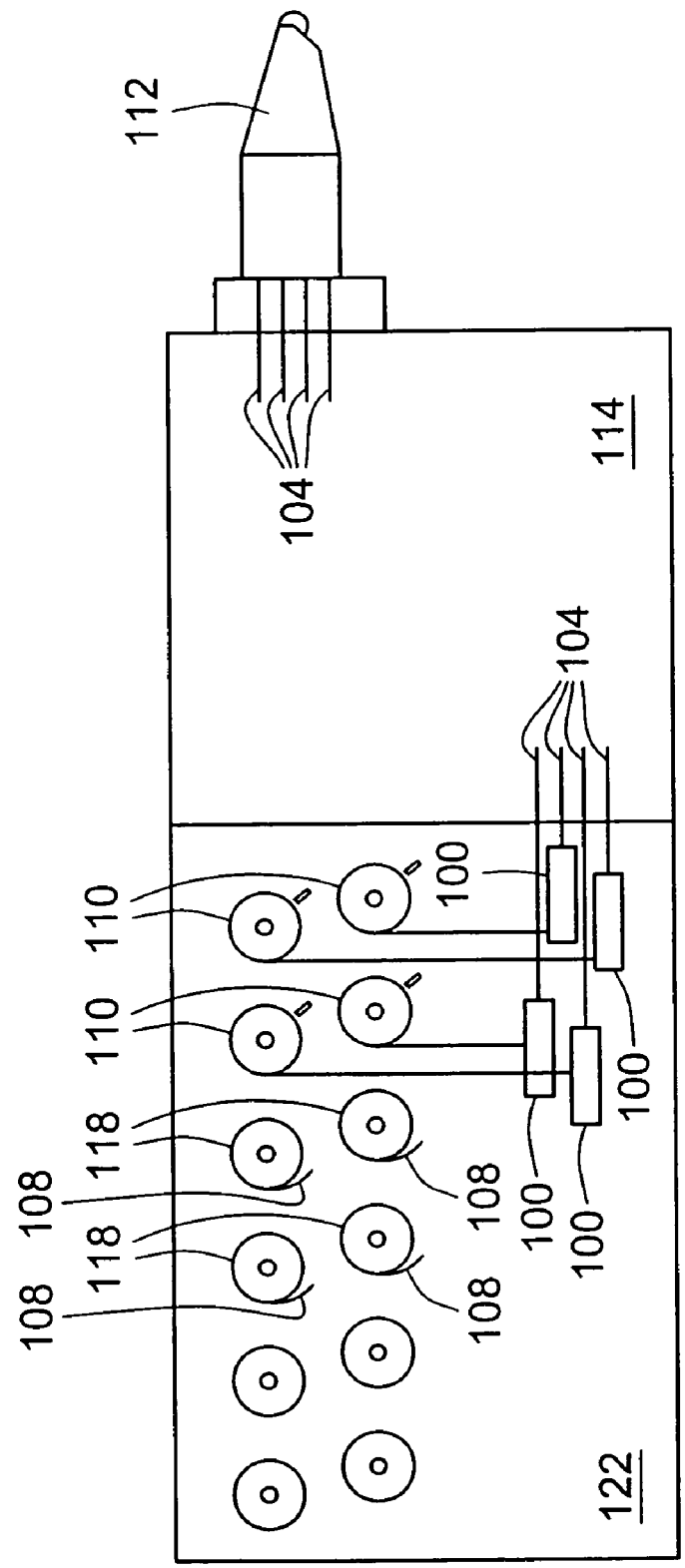

It will be understood, by those having skill in the art, that although the preceding discussion of the first exemplary embodiment of the invention has included only a single first reel 110 and a single second reel 118 supplying a single first fiber tow 104 and a single second fiber tow 108, the invention may also be practiced, in the manner schematically illustrated in FIG. 10, with multiple first tows 104 being supplied to a fiber placement head 112, and each of the first fiber tows 104 having associated therewith a separate auto-splice apparatus 100 for assisting an operator in splicing the tail ends of the first fiber tows 104 to the lead ends 106 of one of a plurality of second fiber tows 108 supplied by a plurality of second reels 118, with the splicing process being carried out by the operator with assistance of the auto-splice apparatus 100 according to the illustrations and description given above with reference to FIGS. 4-9.

FIGS. 11 and 12 illustrate a second exemplary embodiment of an auto-splice apparatus 200 for use in an application where a plurality of first reels are operatively mounted in a first creel 202, and a plurality of second reels 118 are mounted in a second creel 204 with the first and second creels 202, 204 being configured for operative alternate attachment to a fiber placement machine 206, in a manner which allows all of the multiple fiber tows being fed to the fiber placement head 208 to be simultaneously and quickly changed by detaching the first creel 202 from the fiber placement machine 206, and operatively attaching the second creel 204 to the fiber placement machine 206, in place of the first creel 202. Operation of the fiber placement machine 206 may then be resumed, using second fiber tows from the second creel 204, and replenishment of the first creel 202 may take place off-line, while the fiber placement machine 206 is continuing the fiber placement process using the second tows from the second reels 118 and the second creel 204. When the second creel is exhausted, the process may be reversed by detaching the second creel 204 and reattaching the first creel 202, with the second creel then being replenished off-line. Alternatively, a series of creels may be sequentially attached to the fiber placement machine 206, during the fiber placement process, rather than merely alternating a first and a second creel 202, 204.

The ability to interchange creels, according to the invention, not only expedites the fiber placement process, by eliminating much of the dead time present in prior fiber placement processes utilizing creels fixedly attached to the fiber placement machine, but also allows the additional flexibility of effectively and efficiently changing the material in one or more of the multiple fiber tows at selected points in the fiber placement process, to allow some of the tows to be changed from one material, such as carbon fiber, to other materials such as fiberglass or Aramid fibers.

In order to facilitate the use of the interchange creels 202, 204, the second exemplary embodiment of the auto-splice apparatus 200 has a first half 210 thereof, fixedly attached to the fiber placement machine 206, for clamping and trimming the tail ends 102, of the first fiber tows 104, and for welding the overlapped portions of the first and second tows 104, 108, following attachments of one of the creels 202, 204 to the fiber placement machine 206.

The second exemplary embodiment of the auto-splice apparatus 200 has multiple second halves 212 thereof, with one of the multiple second halves 212 being disposed in the first creel 202 and another of the multiple second halves being disposed in the second creel 204. The second halves 212 are configured for clamping the respective lead ends of the first and second tows 104, 108 within the first and second creels 202, 204 respectively, when the first and second creels 202, 204 are not operatively connected to the fiber placement machine 206. The second halves 212 are further configured for feeding the lead ends of the first and second fiber tows 104, 108, respectively, into the first half 210 of the auto-splice apparatus 200, when the respective first or second creel 202, 204 is operatively attached to the fiber placement machine.

The first half 210 of the second exemplary embodiment of the auto-splice apparatus 200 includes a tail end clamping device 214, a welding device 216, and a tail end trimming device 218, operatively connected and disposed with respect to one another in a manner very similar to their respective counterparts 132, 136, 134, in the first exemplary embodiment of the auto-splice apparatus 100, described above. When a creel change is initiated, the tail end clamping device 214 clamps the tail ends of the first tows, extending outward to the fiber placement 208, in place within the fiber placement machine, and the tail end trimming device 218 is actuated to sever the first plys, so that the first creel 202 can be removed, and to simultaneously trim the tail ends of the first plys in a manner facilitating the splicing operation with the auto-splice apparatus 200.

When the second creel 204 is loaded, off-line, the lead ends of the second tows 108 are fed into the second half 212 of the auto-splice apparatus attached to the second creel 204. Specifically, the lead ends of the tows are fed beneath one or more feed rollers 220, of the second half 212 of the auto-splice apparatus 200, and are clamped in place by one or more lead end clamps 222 of the second half 212 of the auto-splice apparatus 200.

When one of the removable creels 202, 204 is attached to the fiber placement machine 206, alignment features, such as alignment pins received in tightly fitting bores, are utilized to accurately align the first and second halves 210, 212 of the auto-splice apparatus 200. After the creel (202 or 204) is securely attached to the fiber placement machine 206, the second phase of the splicing process is initiated, either by operator activation, or automatically by the auto-splice apparatus in response to signals from one or more sensors which indicates that the creel (202 or 204) is properly attached to the fiber placement machine 206. In the second embodiment of the auto-splice apparatus, the lead ends of the second fiber tows are fed into the first half 210 of the auto-splice apparatus by the feed rollers 220 in the second half 212 of the auto-splice apparatus 200 attached to the creel (202, 204) attached to the fiber placement machine 206. Specifically, when the second phase of the splicing process is activated, the lead end clamp 222, in the second half 212 of the auto-splice apparatus 200, unclamps the lead ends of the tows, and the feed roller 220 is simultaneously activated for feeding the tows into the first half 210 of the auto-splice apparatus, in an overlapped manner with the tail ends of the first fiber tows, which are then welded together by the welding device 216 of the first half 210 of the auto-splice apparatus 200. Once the second phase of the splicing process is completed, the fiber placement process is resumed.

With regard to practicing the invention with replaceable creels, it will be understood that the invention may be practiced in a wide variety of embodiments other than the second exemplary embodiment described above. For example, the auto-splice apparatus 200 may be configured in such a manner that the operator must initiate both a first and a second phase of the splicing process, using a two position control element, in much the same fashion as described above with relation to the first exemplary embodiment 100 of the invention. Alternatively, one or both phases of the splicing process may be automatically triggered by control elements within the auto-splice apparatus 200, the fiber placement machine 206, or the creels 202, 204. It is also noted, that the invention could be practiced without the second halves 212 of the auto-splice apparatus 200, or without one or more of the components of the second halves 212, in a manner requiring manual feeding of the tail ends of the second tows into the first half 210 of the second exemplary embodiment of the auto-splice apparatus 200. Some embodiments of a second half 212 of an auto-splice apparatus 200, according to the invention, may also include additional components, such as a lead end trimming device, for trimming the lead ends to a desired length and configuration. It is also noted, that where multiple fiber tows are involved, one or more of the active components 214, 216, 218, 220, 222 of the first and second halves 210, 212 of the second exemplary embodiment of the auto-splice apparatus 200 may be configured in some embodiments of the invention, as individual multiple components acting on a single one of the multiple tows, or alternatively, configured for simultaneously acting on multiple ones of the multiple fiber tows.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating a fiber placement machine during a fiber placement process, the method comprising:
    supporting a first replaceable creel in an alignment position;
    aligning the first replaceable creel with the fiber placement machine; and
    attaching the first replaceable creel to the fiber placement machine,
    wherein the first creel is supported in the alignment position at a creel exchange location, and the method further comprises, moving the fiber placement machine to the creel exchange location.

2. The method of claim 1, further comprising, loading and/or replenishing the first creel with one or more first fiber tows while the first creel is detached from the fiber placement machine.

3. The method of claim 1, wherein, the fiber placement machine has one or more first fiber tows therein, each having a tail end thereof, and the first replaceable creel includes one or more second fiber tows therein, each having a lead end thereof, and the method further comprises, splicing the lead end of at least one of the second fiber tows with a corresponding tail end of at least one of the first fiber tows, using an auto-splice method.

4. The method of claim 3, wherein, the auto-splice method comprises, assisting an operator in splicing the tail end of a first fiber tow to the lead end of the second fiber tow by performing the splicing operation with an auto-splice apparatus having an operator actuated welding device for clamping together and applying heat to overlapped portions of the tail end of the first fiber tow and the lead end of the second fiber tow.

5. The method of claim 1, further comprising, removing the first replaceable creel from the fiber placement machine by:
    aligning the first replaceable creel attached to the fiber placement machine with a creel support structure;
    supporting the first replaceable creel with the support structure;
    detaching the first replaceable creel from the fiber placement machine; and moving the first replaceable creel out of alignment with the fiber placement machine.

6. The method of claim 5, wherein, the support structure is located at a creel exchange location and the method further comprises, moving the fiber placement machine to the creel exchange location.

7. The method of claim 5, further comprising, replenishing the first creel while it is detached from the fiber placement machine.

8. The method of claim 1, further comprising, exchanging the first replaceable creel with a second replaceable creel by:
    aligning the first replaceable creel attached to the fiber placement machine with a creel support structure;
    supporting the first replaceable creel with the support structure;
    detaching the first replaceable creel from the fiber placement machine;
    moving the first replaceable creel out of alignment with the fiber placement machine;
    supporting a second replaceable creel in an alignment position;
    aligning the second replaceable creel with the fiber placement machine; and
    attaching the second replaceable creel to the fiber placement machine.

9. The method of claim 8, wherein, the support structure is located at a creel exchange location and the method further comprises, moving the fiber placement machine to the creel exchange location.

10. The method of claim 8, wherein, the second creel is supported in the alignment position at a creel exchange location, and the method further comprises, moving the fiber placement machine to the creel exchange location.

11. The method of claim 8, further comprising, replenishing the first creel while it is detached from the fiber placement machine.

12. The method of claim 8, further comprising, operating the fiber placement machine with the multiple second fiber tows from the second creel, while the first creel is detached.

13. The method of claim 8, wherein the first and second creels contain one or more spools of fiber tows which are consumed during the fiber placement process, with at least one of the spools in the second creel containing a fiber tow differing from the material or configuration of a corresponding fiber tow in the first creel, and the method further comprises, exchanging the second creel for the first creel to replace the corresponding fiber tow in the first creel with the at least one fiber tow of differing material or configuration at a predetermined point in the fiber placement process.

14. The method of claim 8, wherein the first and second creels contain one or more spools of fiber tows which are consumed during the fiber placement process, and the method further comprises, exchanging the second creel for the first creel when at least one of the spools of fiber tows in the first creel has reached a low material condition.

15. The method of claim 14, further comprising, replenishing the first creel while it is detached from the fiber placement machine.

16. The method of claim 8, wherein, the fiber placement machine has one or more first fiber tows therein, each having a tail end thereof and being supplied from a separate first reel of first fiber tow located within the first creel, and the second replaceable creel includes one or more second fiber tows therein, each having a lead end thereof and being supplied by a separate reel of second tow located within the second creel, and the method further comprises, splicing the lead end of at least one of the second fiber tows with a corresponding tail end of at least one of the first fiber tows, using an auto-splice method.

17. The method of claim 16, wherein, the auto-splice method comprises, assisting an operator in splicing the tail end of the first fiber tow to the lead end of the second fiber tow by performing the splicing operation with an auto-splice apparatus having an operator actuated welding device for clamping together and applying heat to overlapped portions of the tail end of the first fiber tow and the lead end of the second fiber tow.

18. A method for operating a fiber placement machine during a fiber placement process, the method comprising:
supporting a first replaceable creel in an alignment position;
aligning the first replaceable creel with the fiber placement machine; and
attaching the first replaceable creel to the fiber placement machine;
wherein, the fiber placement machine has one or more first fiber tows therein, each having a tail end thereof, and the first replaceable creel includes one or more second fiber tows therein, each having a lead end thereof, and the method further comprises, splicing the lead end of at least one of the second fiber tows with a corresponding tail end of at least one of the first fiber tows, using an auto-splice method;
wherein, the auto-splice method comprises assisting an operator in splicing the tail end of a first fiber tow to the lead end of the second fiber tow by performing the splicing operation with an auto-splice apparatus having an operator actuated welding device for clamping together and applying heat to overlapped portions of the tail end of the first fiber tow and the lead end of the second fiber tow;
and further comprising:
the operator initiating a first phase of the splicing process, performed by the auto-splice apparatus, in which the auto-splice apparatus sequentially clamps the tail end of the first tow extending from the fiber placement head, and trims the tail end of the first tow to a desired length to form a trimmed tail end of the first fiber tow;
the operator feeding the lead end of the second tow into the auto-splice apparatus, with the auto-splice apparatus guiding the lead end into an overlapped position adjacent the trimmed tail end of the first fiber tow to form overlapped portions of the first and second fiber tows; and
the operator initiating a second phase of the splicing process, performed by the auto-splice apparatus, in which the auto-splice apparatus welds together the overlapped portions of the first and second fiber tows, and then unclamps the tail end of the first fiber tow.

19. A method for operating a fiber placement machine during a fiber placement process, the method comprising:
supporting a first replaceable creel in an alignment position;
aligning the first replaceable creel with the fiber placement machine; and
attaching the first replaceable creel to the fiber placement machine;
and further comprising, removing the first replaceable creel from the fiber placement machine by;
aligning the first replaceable creel attached to the fiber placement machine with a creel support structure;
supporting the first replaceable creel with the support structure;
detaching the first replaceable creel from the fiber placement machine; and
moving the first replaceable creel out of alignment with the fiber placement machine;
wherein a plurality of first fiber tows are being fed from first reels of the first fiber tows located within the first creel to a fiber placement head of a fiber placement machine, and the method further comprises, sequentially clamping a tail end of each of the first tows, extending from the fiber placement head, and severing the tail end of the first tow at a desired length thereof within the fiber placement machine to form a trimmed tail end of the first fiber tow.

20. A method for operating a fiber placement machine during a fiber placement process, the method comprising:
supporting a first replaceable creel in an alignment position;
aligning the first replaceable creel with the fiber placement machine; and
attaching the first replaceable creel to the fiber placement machine;
and further comprising, exchanging the first replaceable creel with a second replaceable creel by;
aligning the first replaceable creel attached to the fiber placement machine with a creel support structure;
supporting the first replaceable creel with the support structure;
detaching the first replaceable creel from the fiber placement machine;
moving the first replaceable creel out of alignment with the fiber placement machine;
supporting a second replaceable creel in an alignment position;
aligning the second replaceable creel with the fiber placement machine; and
attaching the second replaceable creel to the fiber placement machine;
wherein, the fiber placement machine has one or more first fiber tows therein, each having a tail end thereof and being supplied from a separate first reel of first fiber tow located within the first creel, and the second replaceable creel includes one or more second fiber tows therein, each having a lead end thereof and being supplied by a separate reel of second tow located within the second creel, and the method further comprises, splicing the lead end of at least one of the second fiber tows with a corresponding tail end of at least one of the first fiber tows, using an auto-splice method; and wherein:
the auto-splice method is performed with an auto-splice apparatus;
the auto-splice apparatus has a first half thereof, fixedly attached to the fiber placement machine for clamping and trimming the tail end of the first tow, and for welding the overlapped portions of the first and second tows;
the auto-splice apparatus has multiple second halves thereof, with one of the multiple second halves being fixedly attached to the first creel and another of the multiple second halves being fixedly attached to the second creel;
the second halves being configured for clamping the respective lead ends of the first and second tows within the first and second creels respectively, when the first and second creels are not operatively connected to the fiber placement machine;
the second halves being further configured for feeding the lead ends of the first and second fiber tows, respectively, into the first half of the auto-splice apparatus, when the respective first or second creel is operatively attached to the fiber placement machine; and
the method further comprises, clamping the respective lead ends of the first and second tows within the first and second creels respectively, when the first and second creels are not operatively connected to the fiber placement machine.

21. The method of claim 20, further comprising, feeding the lead end of the first and second fiber tows into the first half of the auto-splice apparatus, with the second creel operatively attached to the fiber placement machine, to form overlapped portions of the lead end of the second tow and the tail end of the first tow, welding together the overlapped portions of the first and second fiber tows, and then unclamping the tail end of the first fiber tow.

22. The method of claim 20, wherein, the fiber placement machine is receiving multiple first tows from multiple first reels of the first creel, the second creel includes multiple second reels for feeding multiple second fiber tows to the fiber placement machine, and the method further comprises, simultaneously clamping and trimming all of the first fiber tows, prior to detachment of the first creel from the fiber placement machine.

23. A method for operating a fiber placement machine during a fiber placement process, the method comprising:

supporting a first replaceable creel in an alignment position;

aligning the first replaceable creel with the fiber placement machine; and attaching the first replaceable creel to the fiber placement machine;

and further comprising, exchanging the first replaceable creel with a second replaceable creel by;

aligning the first replaceable creel attached to the fiber placement machine with a creel support structure;

supporting the first replaceable creel with the support structure;

detaching the first replaceable creel from the fiber placement machine;

moving the first replaceable creel out of alignment with the fiber placement machine;

supporting a second replaceable creel in an alignment position;

aligning the second replaceable creel with the fiber placement machine; and attaching the second replaceable creel to the fiber placement machine;

wherein, the fiber placement machine has one or more first fiber tows therein, each having a tail end thereof and being supplied from a separate first reel of first fiber tow located within the first creel, and the second replaceable creel includes one or more second fiber tows therein, each having a lead end thereof and being supplied by a separate reel of second tow located within the second creel, and the method further comprises, splicing the lead end of at least one of the second fiber tows with a corresponding tail end of at least one of the first fiber tows, using an auto-splice method;

wherein, the auto-splice method comprises, assisting an operator in splicing the tail end of the first fiber tow to the lead end of the second fiber tow by performing the splicing operation with an auto-splice apparatus having an operator actuated welding device for clamping together and applying heat to overlapped portions of the tail end of the first fiber tow and the lead end of the second fiber tow; and further comprising:

the operator initiating a first phase of the splicing process, performed by the auto-splice apparatus, in which the auto-splice apparatus sequentially clamps the tail end of the first tow extending from the fiber placement head, and trims the tail end of the first tow to a desired length to form a trimmed tail end of the first fiber tow;

the operator feeding the lead end of the second tow into the auto-splice apparatus, with the auto-splice apparatus guiding the lead end into an overlapped position adjacent the trimmed tail end of the first fiber tow to form overlapped portions of the first and second fiber tows; and the operator initiating a second phase of the splicing process, performed by the auto-splice apparatus, in which the auto-splice apparatus welds together the overlapped portions of the first and second fiber tows, and then unclamps the tail end of the first fiber tow.

24. The method of claim 23, wherein:

the auto-splice apparatus has a first half thereof, fixedly attached to the fiber placement machine for clamping and trimming the tail end of the first tow, and for welding the overlapped portions of the first and second tows;

the auto-splice apparatus has multiple second halves thereof, with one of the multiple second halves being fixedly attached to the first creel and another of the multiple second halves being fixedly attached to the second creel;

the second halves being configured for clamping the respective lead ends of the first and second tows within the first and second creels respectively, when the first and second creels are not operatively connected to the fiber placement machine;

the second halves being further configured for feeding the lead ends of the first and second fiber tows, respectively, into the first half of the auto-splice apparatus, when the respective first or second creel is operatively attached to the fiber placement machine; and the method further comprises, clamping the respective lead ends of the first and second tows within the first and second creels respectively, when the first and second creels are not operatively connected to the fiber placement machine.

25. The method of claim 24, further comprising, feeding the lead end of the second fiber tow, into the first half of the auto-splice apparatus, when the second creel is operatively attached to the fiber placement machine, and the second phase of the auto-splice process is initiated.

26. The method of claim 24, wherein, the fiber placement head is receiving multiple first tows from multiple first reels of the first creel with the second creel including multiple second reels for feeding multiple second fiber tows to the fiber placement head, and the first phase of the splicing process of the method further comprises, simultaneously clamping and trimming all of the first fiber tows, prior to detachment of the first creel from the fiber placement machine.

* * * * *

UNITED STATES PATENT AND TRADEMARK OFFICE
CERTIFICATE OF CORRECTION

PATENT NO. : 7,632,372 B2  Page 1 of 1
APPLICATION NO. : 11/510164
DATED : December 15, 2009
INVENTOR(S) : Hoffmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twenty-first Day of December, 2010

David J. Kappos
*Director of the United States Patent and Trademark Office*